Nov. 19, 1935. W. A. CLARK 2,021,405
SPRING STRUCTURE
Filed Sept. 10, 1934
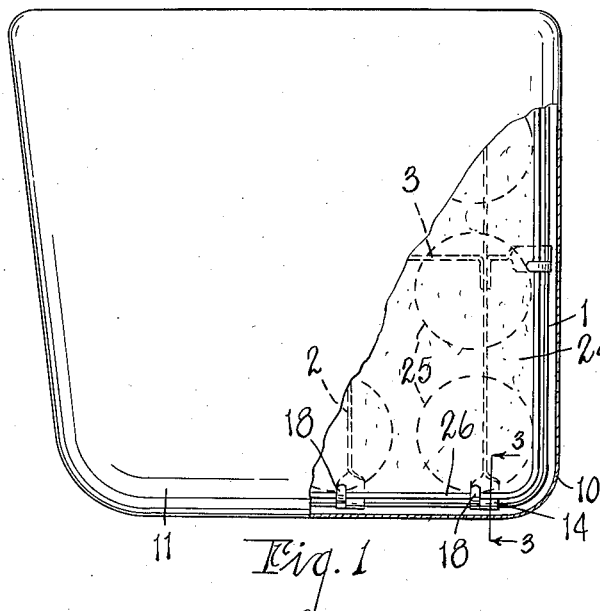
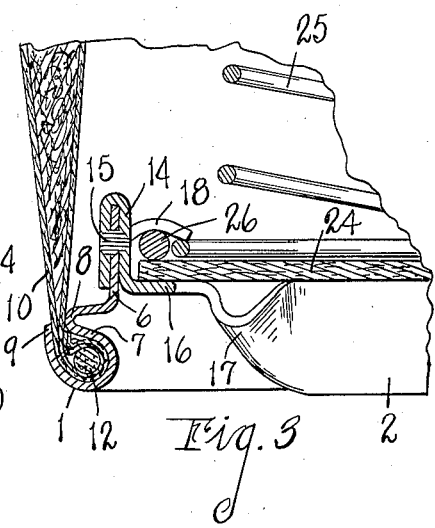
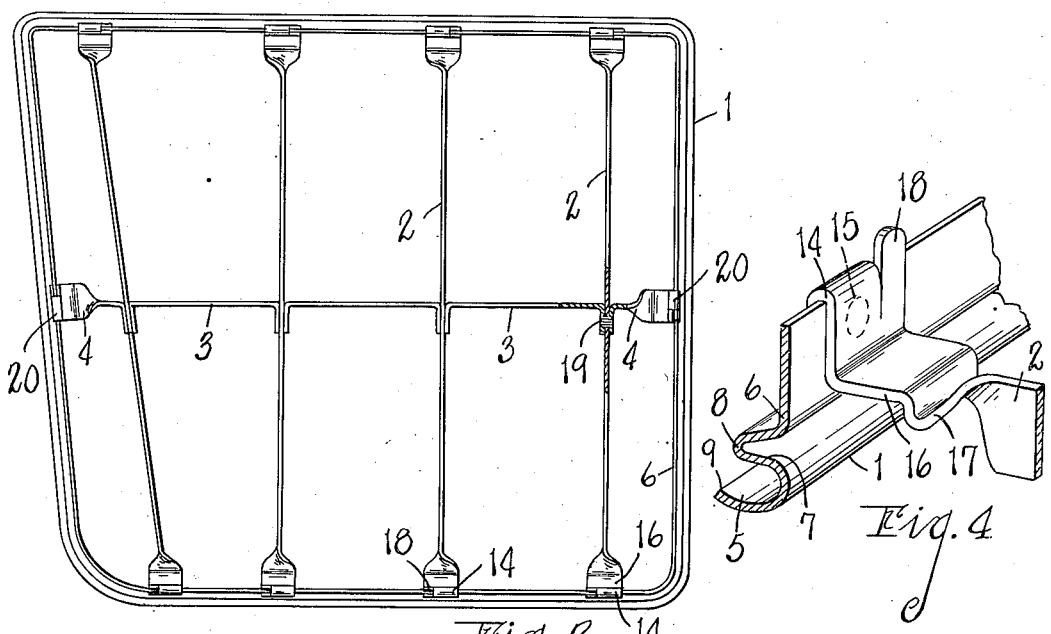
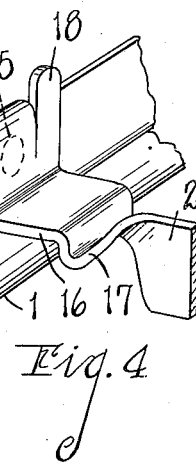
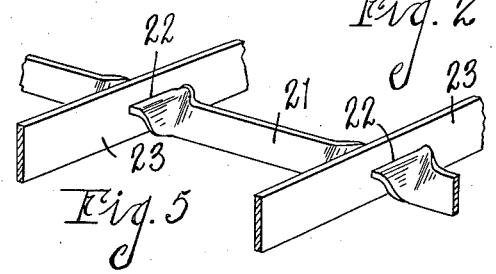
INVENTOR.
William A. Clark
BY
ATTORNEYS Patented Nov. 19, 1935

2,021,405

UNITED STATES PATENT OFFICE 2,021,405

SPRING STRUCTURE

William A. Clark, Detroit, Mich., assignor to L. A. Young Spring and Wire Corporation, Detroit, Mich.

Application September 10, 1934, Serial No. 743,330

5 Claims. (Cl. 155—180)

The main object of this invention is to provide an improved spring structure which may be manufactured of comparatively light material and which at the same time is very strong and rigid and capable of withstanding severe usage thereby well adapting it for trucks, busses and the like.

Objects relating to details and economies of my invention will appear from the description to follow. The invention is defined and pointed out in the claims.

A structure which is a preferred embodiment of my invention is illustrated in the accompanying drawing, in which:

Fig. 1 is a fragmentary plan view of a spring cushion structure embodying the features of my invention, the body springs being conventionally illustrated, a portion of the upholstery being broken away and sectioned to disclose the relation of the parts.

Fig. 2 is a plan view of the base frame partially broken away and sectioned to better illustrate the structure.

Fig. 3 is an enlarged fragmentary section on line 3—3 of Fig. 1.

Fig. 4 is a fragmentary perspective view showing the body frame before the bottom panel and spring unit are mounted therein.

Fig. 5 is a fragmentary perspective view of a modified form of base cross bars and brace pieces.

In the embodiment of my invention illustrated, I provide a base frame consisting of the rim member 1, cross bars 2 and brace pieces 3 and 4 arranged and connected to provide a rigid assembled unit.

The base frame rim member 1 in the embodiment illustrated is formed of a strip of metal and comprises an outwardly facing upholstery receiving channel 5 and an upwardly extending angled cross bar support 6, this cross bar support being joined to the upper arm 7 of the upholstery securing channel by the U-bend 8, the clamping edge 9 of the channel opposing this rounded edge clamps the skirt 10 of the upholstery 11, the upholstery receiving channel being open, as shown in Fig. 4, to receive the beaded edge 12 of the upholstery, the flange 9 of the upholstery receiving channel being then closed and clamped upon the upholstery, as shown in Fig. 3.

The cross bars 2 are arranged on edge and are provided with saddles 14 engaged over the upper edge of the support portion 6 of the base rim and secured thereto preferably by welding, as shown at 15. The saddles have horizontal portions 16 joined to the cross bars by quarter twists 17, or otherwise stated, the cross bars have quarter twists 17 therein to provide a horizontal portion 16. These saddles have bendable tongues 18 formed by slitting the saddle portions, these bendable tongues being adapted to be bent inwardly over the horizontal portions 16.

The brace pieces 3 are arranged between the cross bars and spot welded thereto as shown at 19. The brace pieces 4 terminate in saddles 20 corresponding to the saddles 15 of the cross bars.

In the modification shown in Fig. 5, the brace pieces 21 are formed integrally, these being inserted through horizontal slots 22 in the cross bars 23 corresponding to the cross bars 2 and given quarter twists at each side of the cross bars, thereby securing the brace and cross bars against relative movement.

A panel 24 is preferably provided, this panel being arranged on the cross bars with its edges supported by the horizontal portions of the saddle.

A spring unit comprising body springs 25 and a border frame 26 is provided, the details of connecting the springs and border frame not being illustrated as assemblies adapted for this use are well known in this art.

With the parts superimposed as shown in Fig. 3, the tongues 18 are bent down upon the rim, clamping the bottom panel and the rim between the tongue and the horizontal portions of the cross bars.

With the parts thus arranged, the spring unit may be very quickly assembled with the base frame and the upholstery very quickly attached to the assembled base frame and spring unit.

While I have illustrated a clamping channel as a means for securing the upholstery, it will be understood that satisfactory results may be secured by providing the base rim with other means for securing the upholstery. This particular means, however, is especially desirable because it protects the upholstery, permits application of the upholstery by unskilled workmen and the rim structure is very rigid even when made of light material. The cross section of the border frame effectively presents resistance to distortion in all directions and when braced and supported by the cross pieces and brace pieces, I secure a structure which is capable of withstanding severe usage.

I have not attempted to illustrate or describe other modifications or adaptations of my improvements contemplated as it is believed this disclosure will enable those skilled in the art to embody or adapt my improvements as may be desired.

Having thus described my invention, what I claim as new and desire to secure by Letters Patent, is:

1. In a spring cushion structure, the combination of a base frame comprising a rim member having an outwardly facing upholstery receiving channel portion and an upper angled cross bar support portion extending from the upper arm of its said channel portion, flat cross bars disposed on edge and having saddles at their ends joined thereto by quarter twists and engaged over the upper edge of said cross bar support portion of said rim member and fixedly secured thereto, brace pieces between said cross bars and between the outer cross bars and the rim member, the end brace pieces having saddles corresponding to the saddles of said cross bars and engaging the support portion of said rim member, the said cross bar and brace piece saddles having horizontal portions and integral clamping tongues bendable over their said horizontal portions, a bottom panel arranged above said cross bars with its edges supported by the horizontal portions of said saddles, a body spring unit including a border frame arranged on said panel with its border frame above the horizontal portions of the saddles, said clamping tongues of said saddles being clamped upon the said spring unit border frame, and upholstery having its edges clamped within said outwardly facing upholstery securing channel.

2. In a spring cushion structure, the combination of a rim member having an upholstery receiving channel and an upper cross bar support extending from the upper arm of said channel, flat cross bars disposed on edge and having saddles at their ends joined thereto by twists and engaged over the upper edge of said cross bar support of said rim member and fixedly secured thereto, brace pieces between said cross bars and between the outer cross bars and the rim member, the end brace pieces having saddles corresponding to the saddles of said cross bars and engaging the support portion of said rim member, the said cross bar and brace piece saddles having horizontal portions and integral clamping tongues bendable over their said horizontal portions, a bottom panel arranged above said cross bars with its edges supported by the horizontal portions of said saddles, a body spring unit including a border frame arranged on said panel with its border frame above the horizontal portions of the saddles, said clamping tongues of said saddles being clamped upon the said spring unit border frame, and upholstery having its edges clamped within said outwardly facing upholstery receiving channel.

3. In a spring cushion structure, the combination of a base frame comprising a rim member having a lower upholstery securing portion and an upper cross bar support portion, flat cross bars disposed on edge and having saddles at their ends joined thereto by quarter twists and engaged over the cross bar support portion of said rim member and secured thereto, transverse members having saddles corresponding to the saddles of said cross bars and engaging the support portion of said rim member, the saddles having horizontal portions and integral clamping tongues, a bottom panel arranged above said cross bars with its edges supported by the horizontal portions of said saddles, and a body spring unit including a border frame arranged on said panel with its border frame above the horizontal portions of the saddles, said clamping tongues of said saddles being clamped upon the said spring unit border frame.

4. In a spring cushion structure, the combination of a base frame comprising a rim member having a lower upholstery securing portion and an upper cross bar support portion, flat cross bars disposed on edge and having saddles at their ends secured to said support portions, transverse members having saddles corresponding to the saddles of said cross bars and secured to the support portion of said rim member, the saddles having clamping tongues, a bottom panel arranged above said cross bars, and a body spring unit including a border frame arranged on said panel with its border frame clamped by said tongues.

5. In a spring cushion structure, the combination of a base frame comprising a rim member having a lower upholstery securing portion and an upper cross bar support portion, flat cross bars disposed on edge and having saddles at their ends joined thereto by quarter twists and engaged over the upper edge of said cross bar support portion of said rim member and secured thereto, transverse members having saddles corresponding to the saddles of said cross bars and engaging the support portion of said rim member, the saddles having horizontal portions and integral clamping tongues, and a body spring unit including a border frame, said clamping tongues of said saddles being clamped upon the said spring unit border frame.

WILLIAM A. CLARK.